UNITED STATES PATENT OFFICE.

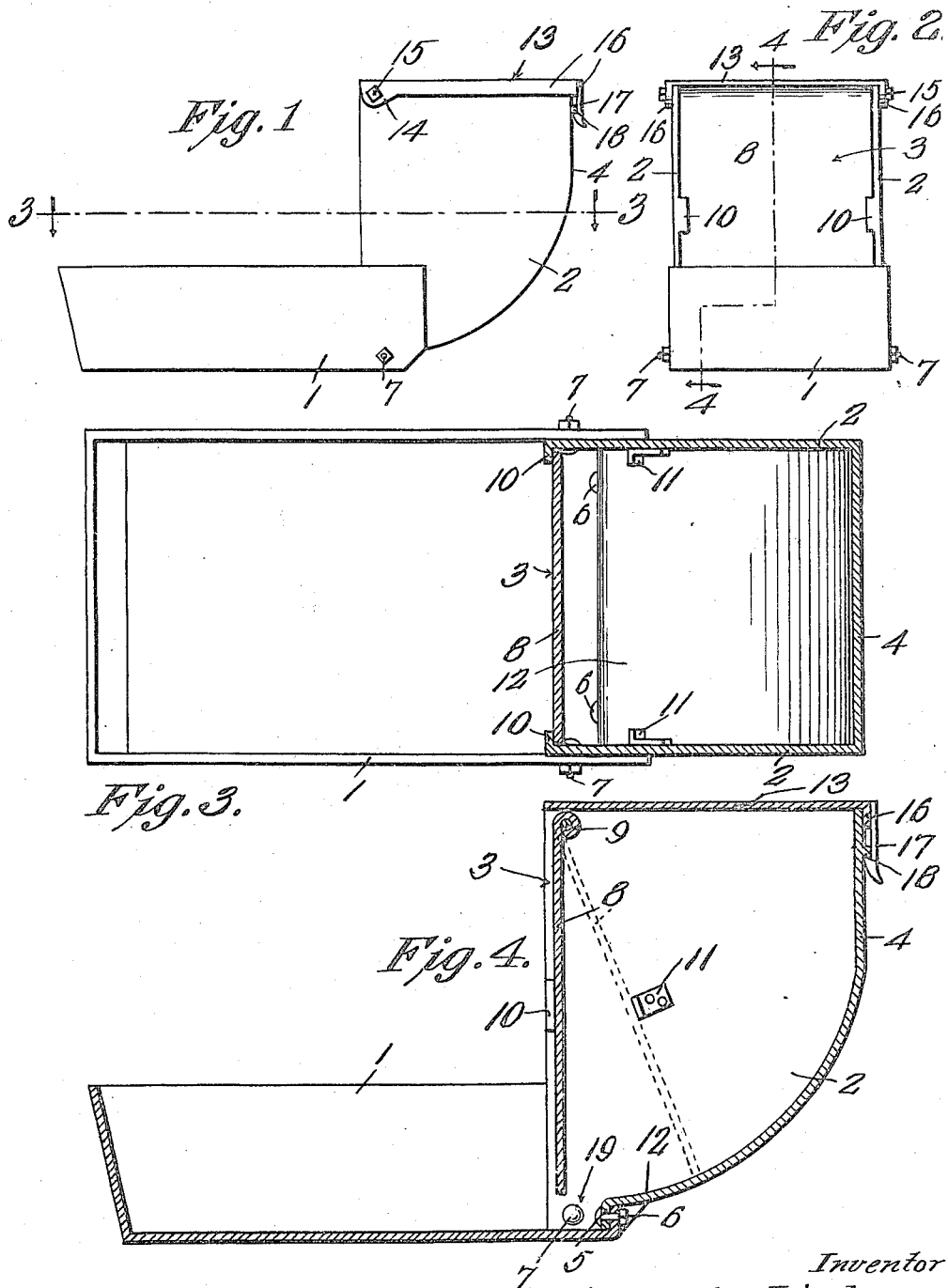

AUGUST LINDQUIST, OF SISSETON, SOUTH DAKOTA.

FEED-BOX.

1,239,116.        Specification of Letters Patent.        Patented Sept. 4, 1917.

Application filed September 11, 1916. Serial No. 119,568.

*To all whom it may concern:*

Be it known that I, AUGUST LINDQUIST, a citizen of the United States, residing at Sisseton, in the county of Roberts and State of North Dakota, have invented certain new and useful Improvements in Feed-Boxes, of which the following is a specification.

This invention relates to animal feed boxes and more particularly to a feed box provided with a hopper and provided with means for permitting a minimum of food being dispensed from the hopper to the feed box while the animal is feeding.

A further object of the invention resides in the provision of a structure for preventing the animal from wasting the fodder as it is being eaten.

A further object of this invention is the provision of a feed box which consists of comparatively few parts and is simple in construction, but durable and well adapted to withstand the rough usage to which devices of this character are ordinarily subjected.

For a full description of the invention and the advantages and merits thereof, reference is to be had to the following description and the accompanying drawings, wherein is illustrated the preferred form of my invention, in which;

Figure 1 is a side elevation.

Fig. 2 is a front elevation.

Fig. 3 is a horizontal section on the line 3—3 of Fig. 1.

Fig. 4 is a section on the line 4—4 of Fig. 2.

Referring to the drawing, wherein is illustrated the preferred form of my invention, and in which like numerals of reference indicate corresponding parts throughout the several views, the feed box 1 is of rectangular formation and its rear end is open and has the rear edge of the bottom wall bent upwardly at right angles as clearly shown by Fig. 4 of the drawing. Arranged within the rear open end of the feed box is a hopper 2 having its front side 3 open and its rear side closed by the wall 4. This wall 4 is curved downwardly and forwardly and is provided with a lip 5 which contacts with the upturned edge of the hopper and this lip 5 and the said edge are bolted together by the fastening bolts 6. The side walls of the hopper and the side walls of the feed box 1 are bolted together by the bolts 7.

A swinging door 8 is arranged in the front opening 3 of the hopper and is mounted on the pintle 9 which has its ends mounted in the side walls of the hopper thereby permitting the door 8 to freely swing. For preventing the door from swinging outwardly through the opening I provide the restricting flanges 10 formed by inturned portions of the side edges of the hopper. The rearward swinging movement of the door 8 is also limited by the stop members 11 which are mounted on the interior of the hopper and secured to the side walls thereof. It will be noted that the curved wall of the hopper, where it joins the feed box provides a shelf 12 the edge of which is formed by the bent lip 5.

A cover 13 is mounted on the top of the hopper and is provided with ears 14 which are pivotally mounted on the bolts 15 carried by the side walls of the hopper. The rear edge of the cover 13 is provided with a lip or flange 16 carrying a spring catch 17 adapted to engage a lug 18 formed on the rear wall of the hopper. This catch prevents the cover from being raised by the animal.

In use, the hopper will be filled with suitable fodder for the animal and, of course, since the swinging door 8 is hung in a vertical position the edge of the door is disposed in the position whereby a space 19 is provided between the edge of the shelf 12 and the edge of the door 8. The contents of the hopper will drop through the opening or space 19 until the space is obstructed. In seeking the fodder, the animal will place its nose against the swinging door 8 thereby forcing the same rearwardly to the position shown by dotted lines in Fig. 4. Access to the deposited fodder in the bottom of the feed boxes is thereby easily obtained and no more fodder can be obtained by the animal until the swinging door is permitted to swing back to vertical position. The animal is thereby obliged to consume small quantities at a time and a great saving in the fodder is thereby effected.

From the foregoing it will be observed that a very simple and durable feed box has been provided, the details of which embody the preferred form. I desire it to be understood however, that slight changes in the minor details of construction may be made without departing from the spirit of the invention or the scope of the claims hereunto appended.

I claim:

1. The combination with a feed box having a turned-up flange formed at its open end, a hopper mounted in the open end of the feed box, the end of the bottom wall of the hopper being curved to provide a lip contacting with the upturned flange of the feed box, thereby providing a shelf at the intersection of the feed box and hopper, a swinging closure for the open front of the hopper, the lower marginal edge of the closure being normally disposed in spaced relation to the edge of the said shelf to normally provide a restricted passageway between the interior of the hopper and the feed box.

2. The combination with a feed box having a turned-up flange formed at its open end, a hopper mounted in the open end of the feed box, the end of the bottom wall of the hopper being curved to provide a lip contacting with the upturned flange of the feed box, thereby providing a shelf at the intersection of the feed box and hopper, a swinging closure for the open front of the hopper, the lower marginal edge of the closure being normally disposed in spaced relation to the edge of the said shelf to normally provide a restricted passageway between the interior of the hopper and the feed box, the wall of the hopper being curved from the rear thereof to the said shelf and adapted to contact with the lower marginal edge of the closure when the latter is swung inwardly for preventing the contents of the hopper from passing through the said passageway.

3. The combination with a feed box having an open end, a hopper mounted within the open end and disposed vertically whereby the contents of the hopper may pass into the said feed box, one wall of the hopper being curved toward the feed box to divert the contents of the hopper into the feed box, a swinging door arranged in the hopper, the curved wall of the said hopper terminating adjacent the edge of the said swinging door to provide a relatively narrow space, the edge of the said door adapted to swing into engagement with the said curved wall for obstructing the passage from the hopper into the feed box.

In testimony whereof I affix my signature in presence of two witnesses.

AUGUST LINDQUIST.

Witnesses:
A. W. HANSON,
ALFRED NELSON.

Copies of this patent may be obtained for five cents each, by addressing the "Commissioner of Patents, Washington, D. C."